United States Patent Office 3,331,504
Patented July 18, 1967

3,331,504
BENEFICIATION OF POTASH ORES
Wilbert L. O'Connell, Jr., Midland, Mich., and Elmer C. Tveter, Concord, Calif., assignors to The Dow Chemical Company, Midland, Mich., a corporation of Delaware
No Drawing. Filed May 18, 1962, Ser. No. 196,007
7 Claims. (Cl. 209—2)

This invention relates to the beneficiation of potash ores, and more particularly to a method for refining of sylvite ores by a sink-float process.

Ores are commonly separated by means utilizing differences in specific gravities of their solid components. Usually, these means employ a liquid or mixture of liquids having a specific gravity intermediate the solid components of the ore, the lighter solid component floating on the liquid and the heavier solid component sinking to the bottom of the liquid. Such means are generally known as "Sink-Float" processes.

It is apparent that a significant difference between the specific gravities of the solid ore components is necessary to give sufficient separation within a reasonable time. Further, it is usually necessary that the separating liquid employed wet the component which is to sink. Non-wetted solids tend to have an apparent specific gravity less than their true specific gravity. When specific gravity differences between the solid which is to sink and the separating liquid are small, failure of the liquid to wet the solid could cause significant amounts of the solid to float so that separation would be poor.

Sylvite ore is generally found in deposits which may contain, in addition to potassium chloride and sodium chloride, quantities of a variety of clays. Predominant among these clays is montmorillonite. When water is present to any large degree, montmorillonite and other clays usually associated with sylvite ores tend to form a slime which retards separation of potassium chloride from the remainder of the sylvite ore. Further, montmorillonite and other similar clays, in the presence of most of the liquids heretofore used for sink-float separation of sylvite ores, exhibit a tendency to swell. This swelling causes a lessening of the apparent specific gravity of the clay so that the clay tends to float with potassium chloride.

Consequently, it has been necessary to carry out an expensive desliming process to remove clay from the sylvite ore prior to separating potassium chloride from sodium chloride by sink-float means.

Not only the slime and swelling problems, but also the fact that montmorillonite clay has a specific gravity of 2 compared with a specific gravity of 1.988 for potassium chloride (as listed in Lange's Handbook of Chemistry, eighth edition) made single-step clay removal and separation unfeasible.

It has now been discovered that when sylvite ore, which may contain clay, is treated in the sink-float process of the present invention, substantially pure potassium chloride may be recovered as the float product. Surprisingly, both clay and sodium chloride sink and may be recovered from the liquid as bottoms.

For the purposes of the present process, sylvite ore is preferably ground or otherwise reduced to a size range of about −10 to +48 Tyler mesh. Larger or smaller particle size may be used if desired. Practice generally dictates that smaller particle size gives little improvement in separation, while larger sizing may tend to make the separation unduly crude.

Sized sylvite ore is then treated with an appropriate liquid. Treatment may be accomplished in batch or continuous manner, according to well known sink-float techniques, as, for example, by adding the sized ore to a vessel containing an appropriate liquid and skimming the floating potassium chloride product from the liquid surface. Sufficient liquid is generally used to make separation of sinking and floating material easily accomplished by simple mechanical means.

For the present process, an organic liquid which is substantially non-polar, and has a specific gravity of from about 2.00 to about 2.15 at operating temperature is employed. In order to obtain a liquid having the desired specific gravity two or more appropriate mutually miscible, substantially non-polar liquid organic compounds may be mixed together. Compounds which may be used to prepare the liquid for use in the present process can be selected from liquid substituted and unsubstituted, saturated and unsaturated aliphatics, alicyclics, aromatics, and the like.

Preferred liquid compounds for use in the process of the present invention are the haloganted hydrocarbons, and mixtures thereof, which contain from one to two carbon atoms, and from two to six halogen atoms. Representative examples of such halogenated hydrocarbons and their respective specific gravities, useful in the present process are: methylene bromide (2.485); methylene chlorobromide (1.930); dibromo chloro methane (2.44); tribromo fluoro methane (2.8); bromo trichloro methane (2.0); bromo iodo methane (2.93); dibromo dichloro methane (2.41); bromo dichloro methane (1.97); 1,2-dibromo ethane (2.17); 1,1,2,2-tetrafluoro 1,2-diiodo ethane (2.63); 1,1-dibromo 2,2-difluoro ethane (2.31); 1,2-dibromo 1,1,2-trichloro ethane (2.27); 1,2-dibromo 2-chloro 1,1,2-trifluoro ethane (2.25); 1,2-dibromo 1-chloro 2,2-difluoro ethane (2.23); 2,2-dibromo 1,1,1-trifluoro ethane (2.22); 1,2-dibromo 1,1-difluoro ethane (2.22); 1-chloro 1,1,2-trifluoro 2-iodo ethane (2.18); 1,1-dibromo tetrafluoro ethane (2.15); 1,2-dibromo tetrafluoro ethane (2.14); and the like, and mixture thereof. Water may be present in an amount not in excess of its solubility limit in the liquid or mixture of liquids, at operating temperature.

The above listed specific gravities are for the most part determined at twenty-five degrees centigrade. If the process of the present invention is operated at any other temperature, corresponding adjustment in the above values should usually be made in order that calculations be accurate. When calculation is used only as a rough approximation, temperature-specific gravity data are not critical. For best results, the specific gravity of the liquid or mixture of the liquids should be adjusted to the desired value at the desired operating temperature.

Ideally, mixing of two or more selected appropriate liquids to obtain the desired specific gravity mixture may be accomplished in a standard manner by means of direct proportions. At least one selected liquid must have a specific gravity above the desired range, and at least one other selected liquid must have a specific gravity below the desired range. This is obvious since the specific gravity of the mixture will usually be proportional to the specific gravities and amounts of the compound liquids. For example, methylene bromide (Sp. Gr. 2.485) and methylene chlorobromide (Sp. Gr. 1.930) may be selected. If the desired specific gravity of the mixture is 2.05, then the necessary volume of each component may be calculated thus:

Let $X$ = Milliliters of methylene bromide
$Y$ = Milliliters of methylene chlorobromide
$A$ = Total volume (milliliters) of the mixture
then (1) $$X + Y = A$$

and (2) $$(\text{Sp.Gr. } X)X + (\text{Sp.Gr. } Y)Y = (\text{Sp.Gr. } A)A$$

by assuming a desired total volume (A), Equations 1 and 2 may be solved simultaneously to find the required volume of each component.

If we assume A equal to 100 milliliters, then $X = 21.6$ milliliters
$Y = 78.4$ milliliters Calculations made as above assume that the liquids mixed will behave ideally. Since few liquids behave exactly ideally, adjustments must be made in order to obtain a mixture having the exact desired specific gravity. In practice, then, the above calculation may be made as an approximation of the required volume of each component and final adjustments may be made on the mixture, as by using a hydrometer to check the specific gravity of mixture. By adding small amounts of either the lighter or the heavier liquid, the specific gravity of the mixture may be lowered or raised until the hydrometer floats at the level which indicates that the mixture has the desired specific gravity.

Viscosity of the separating liquid is also an important consideration. High viscosity liquids generally slow down separation because of low settling velocities. Preferred liquids for use in the present process have a viscosity, at twenty-five degrees centigrade, of less than five centipoise. Liquids having higher viscosities are operable, but a longer settling time is required.

An amount of separating liquid usually adheres to the potassium chloride product of the present process. This liquid may be removed by heating and evaporating the liquid. Although the boiling point of the liquid may never actually be reached, it is generally desirable that the liquid be stable at its boiling point. This insures that decomposition of separating liquid, during the removal from the potassium chloride, will be kept at a minimum. The liquid may then be recovered and reused. Preferred liquids, then, have a boiling point, at atmospheric pressure, which is high enough to avoid substantial liquid loss, and low enough to make evaporation of the liquid after separation economical.

It is to be noted that the specific gravity (from 2.0 to 2.15) of the separating liquid used in the present process is equal to or greater than that of the Montmorillonite clay. It was therefore unexpected that the Montmorillonite clay would sink in a liquid of this type.

The following examples are set forth to illustrate, but are not to be construed to limit, the present invention.

*Example 1*

Two mixtures of methylene bromide and methylene chlorobromide were prepared. Required amounts of each compound to give final mixtures having the desired specific gravities were determined first by calculation. Final adjustments in the specific gravities of the mixtures were made using a hydrometer as an indicator. The first mixture had a specific gravity of 2.05, and the second mixture had a specific gravity of 2.10.

Three samples of sylvite ore containing approximately fifteen percent potassium chloride and approximately two percent clays, the balance sodium chloride, were ground to reduce particle size. Each sample was ground to a different degree of fineness. For each sample, two 100 gram portions were taken for testing. The first portion was immersed in a liquid mixture of about 21.6 volume percent methylene bromide and about 78.4 volume percent methylene chlorobromide, said mixture having a specific gravity of 2.05. The second portion was immersed in a liquid mixture of about 30.5 volume percent methylene bromide and about 69.5 volume percent methylene chlorobromide, said mixture having a specific gravity of 2.10. In all, six portions were tested. Float product was skimmed from the surface of the liquid and analyzed for potassium chloride recovery and clay rejection. Sink materials were similarly analyzed. Results of the tests are tabulated below, all balances being sodium chloride.

| Specific Gravity of Liquid | | Particle Size (Tyler mesh) | | |
|---|---|---|---|---|
| | | 6 x 10 | 10 x 48 | 48 x 100 |
| 2.05 | Float Recovery (Percent of KCl charged) | 85 | 93 | 89 |
| | Grade (Percent of KCl in float) | 94 | 95 | 98 |
| | Clay Rejection (Percent in sinks) | 95 | 96 | 95 |
| 2.10 | Float Recovery | 97 | 98 | 93 |
| | Grade | 84 | 92 | 97 |
| | Clay Rejection | 90 | 94 | 93 |

*Example 2*

Using substantially the same procedure outlined in Example 1, dibromo chloro methane; tribromo fluoro methane; bromo trichloro methane; bromo iodo methane; dibromo dichloro methane; bromo dichloro methane; 1,2-dibromo ethane; 1,1,2,2-tetrafluoro 1,2-diiodo ethane; 1,1-dibromo 2,2-difluoro ethane; 1,2-dibromo 1,1,2-trichloro ethane; 1,2-dibromo 2-chloro 1,1,2-trifluoro ethane; 1,2-dibromo 1-chloro 2,2-difluoro ethane; 2,2-dibromo 1,1,1-trifluoro ethane; 1,2-dibromo 1,1-difluoro ethane; 1-chloro 1,1,2-trifluoro 2-iodo ethane; 1,1-dibromo tetrafluoro ethane; 1,2-dibromo tetrafluoro ethane; benzene; toluene; cyclohexane; kerosene; and the like; and mixtures thereof may be substituted for methylene bromide and methylene chlorobromide herein employed in the preparation of the process liquid having a specific gravity of from 2.00 to 2.15. When such substitution is made, the resulting separation of KCl from sylvite ore is substantially the same as shown in Example 1.

Various modifications may be made in the present invention without departing from the spirit or scope thereof, and it is to be understood that we limit ourselves only as defined in the appended claims.

We claim:

1. A sink-float process for the beneficiation of clay-containing sylvite ores comprising, immersing said ore of the desired particle size in an organic, substantially non-polar separating liquid consisting essentially of at least one liquid, organic, substantially non-polar compound, said separating liquid having a specific gravity of from 2.00 to 2.15, whereby potassium chloride is floated away from the clay and sodium chloride in said sylvite ore.

2. A sink-float process for the beneficiation of clay-containing sylvite ores comprising, immersing said ore of the desired particle size in an organic, substantially non-polar separating liquid consisting essentially of at least one liquid, organic, substantially non-polar compound, said separating liquid having a specific gravity of from 2.00 to 2.15, whereby potassium chloride is floated away from the clay and sodium chloride in said sylvite ore, removing floating potassium chloride from the surface of the liquid, and removing residual liquid from the potassium chloride product.

3. A sink-float process for the beneficiation of clay-containing sylvite ores comprising, immersing said ore of the desired particle size in an organic, substantially non-polar separating liquid consisting essentially of at least one liquid halogenated hydrocarbon compound, said compound containing from one to two carbon atoms and from two to six halogen atoms, said separating liquid having a specific gravity of from 2.00 to 2.15, whereby potassium chloride is floated away from the clay and sodium chloride in said sylvite ore.

4. A sink-float process for the beneficiation of clay-containing sylvite ores comprising, immersing said ore of the desired particle size in an organic, substantially non-polar separating liquid consisting essentially of at least one liquid halogenated hydrocarbon compound, said compound containing from one to two carbon atoms and from two to six halogen atoms, said separating liquid having a specific gravity of from 2.05 to 2.10, whereby potassium chloride is floated away from the clay and sodium chloride in said sylvite ore.

5. A sink-float process for the beneficiation of clay-containing sylvite ores comprising, immersing said ores of the desired particle size in an organic, substantially non-polar separating liquid consisting essentially of at least one liquid halogenated hydrocarbon compound, said compound containing from one to two carbon atoms and from two to six halogen atoms, said separating liquid having a specific gravity of from 2.00 to 2.15, whereby potassium chloride is floated away from the clay and sodium chloride in said sylvite ore, removing floating potassium chloride from the surface of the liquid, and removing residual liquid from the potassium chloride product.

6. A process for the beneficiation of clay-containing sylvite ores comprising, immersing said ore of the desired particle size in a liquid mixture of methylene bromide and methylene chlorobromide, said mixture having a specific gravity of from 2.00 to 2.15, whereby potassium chloride is floated away from the clay and sodium chloride in said sylvite ore.

7. A process for the beneficiation of clay-containing sylvite ores comprising, immersing said ore of the desired particle size in a liquid mixture of methylene bromide and methylene chlorobromide, said mixture having a specific gravity of from 2.05 to 2.10, whereby potassium chloride is floated away from the clay and sodium chloride in said sylvite ore.

References Cited
UNITED STATES PATENTS

| | | | |
|---|---|---|---|
| 2,150,917 | 7/1939 | Foulke | 209—172 |
| 2,165,607 | 7/1939 | Blow | 209—172 |
| 3,059,774 | 10/1962 | Wilson | 209—166 |

FRANK W. LUTTER, *Primary Examiner.*